United States Patent [19]
Johnson

[11] Patent Number: 5,156,576
[45] Date of Patent: Oct. 20, 1992

[54] COMPACT INTEGRATED TRANSAXLE

[75] Inventor: Alan W. Johnson, Ames, Iowa

[73] Assignee: Sauer, Inc., Ames, Iowa

[21] Appl. No.: 703,930

[22] Filed: May 22, 1991

[51] Int. Cl.$^5$ ............................................. F16H 57/02
[52] U.S. Cl. ................................... 475/72; 475/206; 74/606 R; 60/487
[58] Field of Search ................. 475/72, 83, 84, 206; 74/606 R; 60/487

[56] References Cited

U.S. PATENT DOCUMENTS

| | | | |
|---|---|---|---|
| 2,808,738 | 10/1957 | Bartell | 475/206 X |
| 3,805,641 | 4/1974 | Hause | 475/83 |
| 4,103,566 | 8/1978 | von Kaler et al. | 475/206 |
| 4,862,767 | 9/1989 | Hauser | 475/206 X |
| 4,893,524 | 1/1990 | Ohashi et al. | 475/83 |
| 4,903,545 | 2/1990 | Louis et al. | 475/83 X |
| 4,922,787 | 5/1990 | Fujisaki et al. | 475/83 |
| 4,966,574 | 10/1990 | von Kaler et al. | 475/206 |

*Primary Examiner*—Richard Lorence
*Assistant Examiner*—William O. Trousdell
*Attorney, Agent, or Firm*—Zarley, McKee, Thomte, Voorhees & Sease

[57] ABSTRACT

A compact integrated transaxle has a two-piece transaxle casing for rotatably mounting a pair of oppositely extending axles along a peripheral seam formed between an upper casing part and a lower casing part. A hydrostatic transmission is also mounted in the transaxle casing and has a center section positionable in the transaxle casing with a pair of perpendicular faces each mounting a hydraulic displacement unit. One of the center section faces defines a hydraulic pump mounting surface and is offset from the plane defined by the peripheral seam. A counter-rotating intermediate shaft is interposed between an output shaft on one of the hydraulic units and the axles and is journalled within the transaxle casing offset from the plane defined by the peripheral seam.

10 Claims, 5 Drawing Sheets

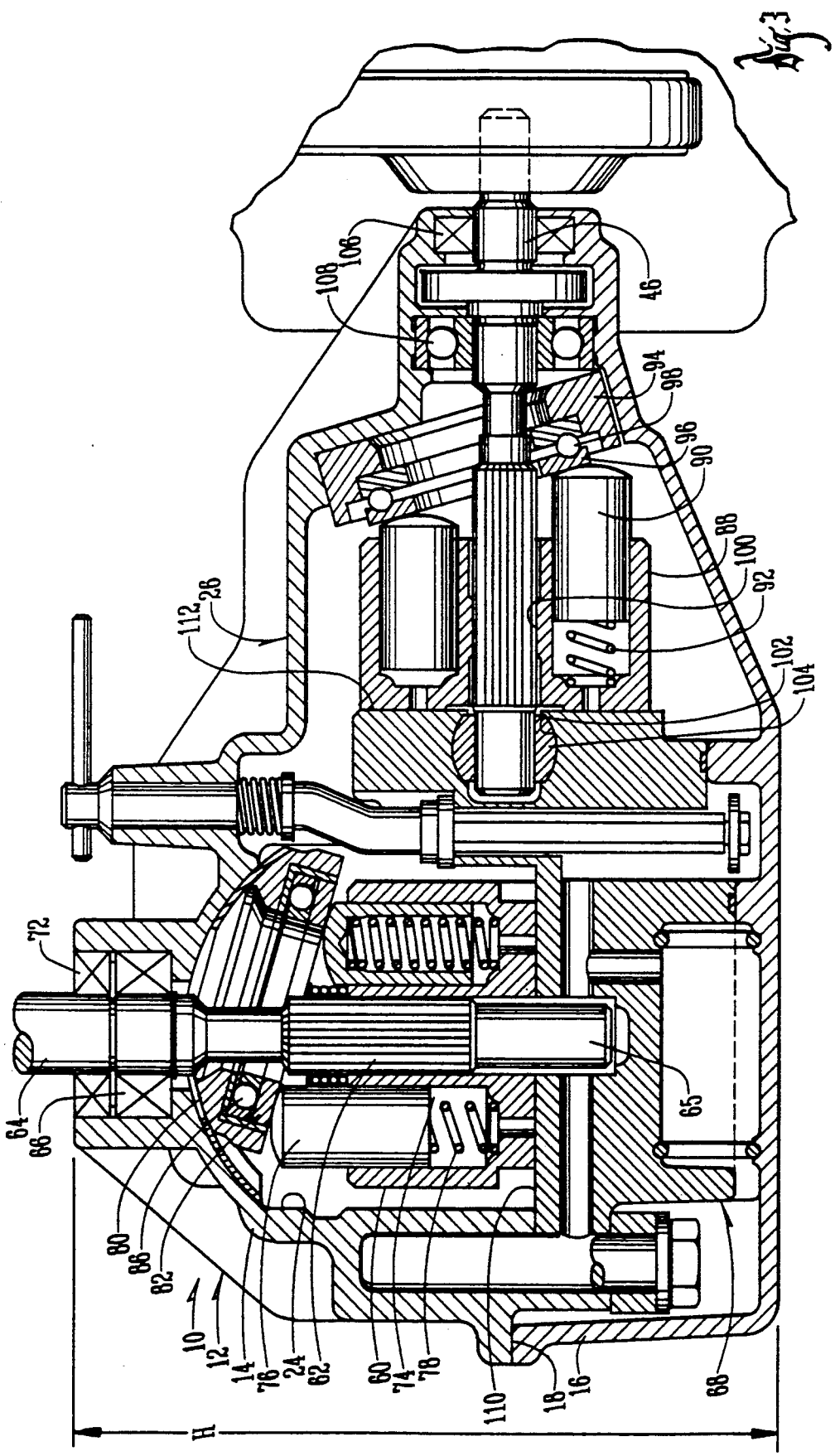

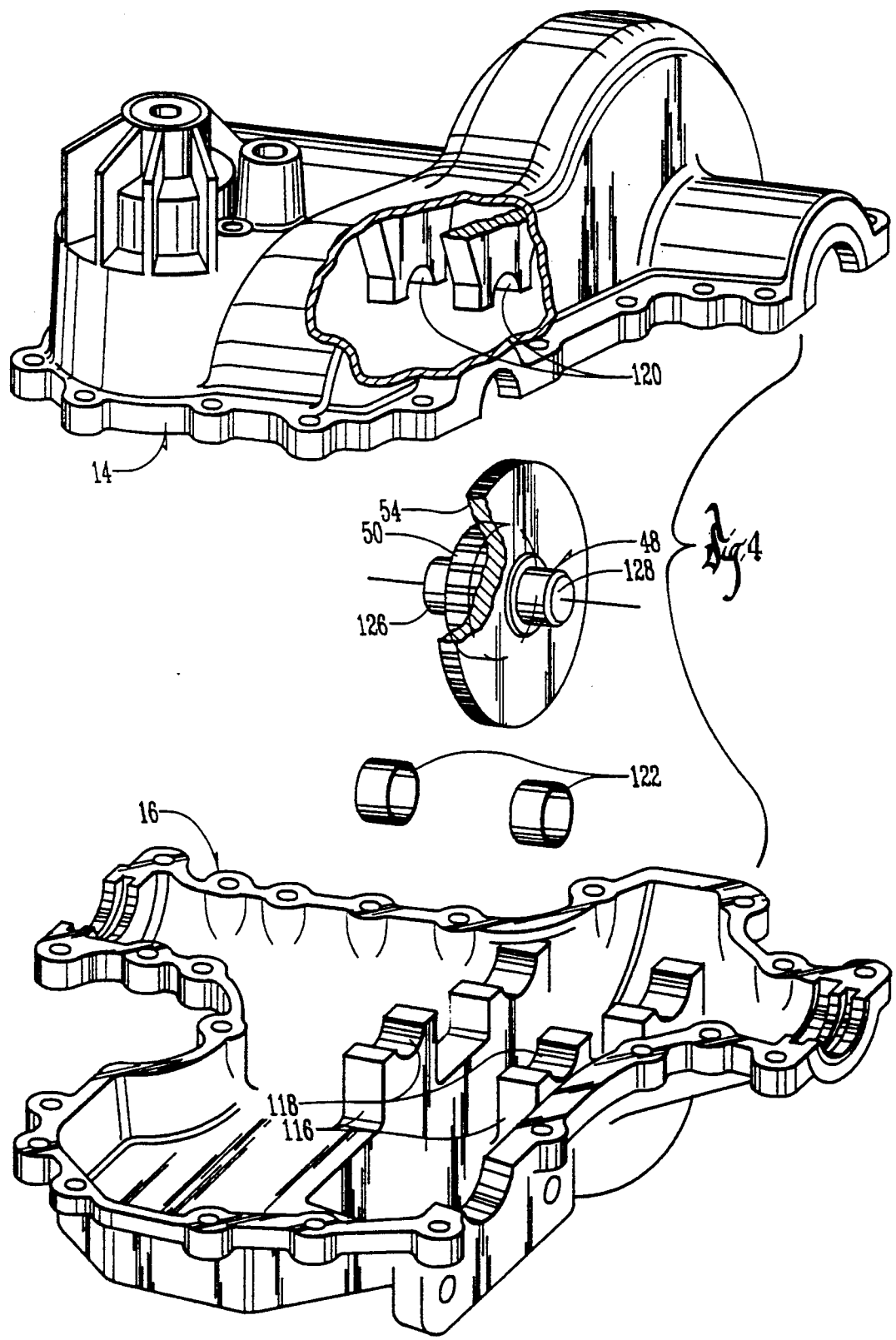

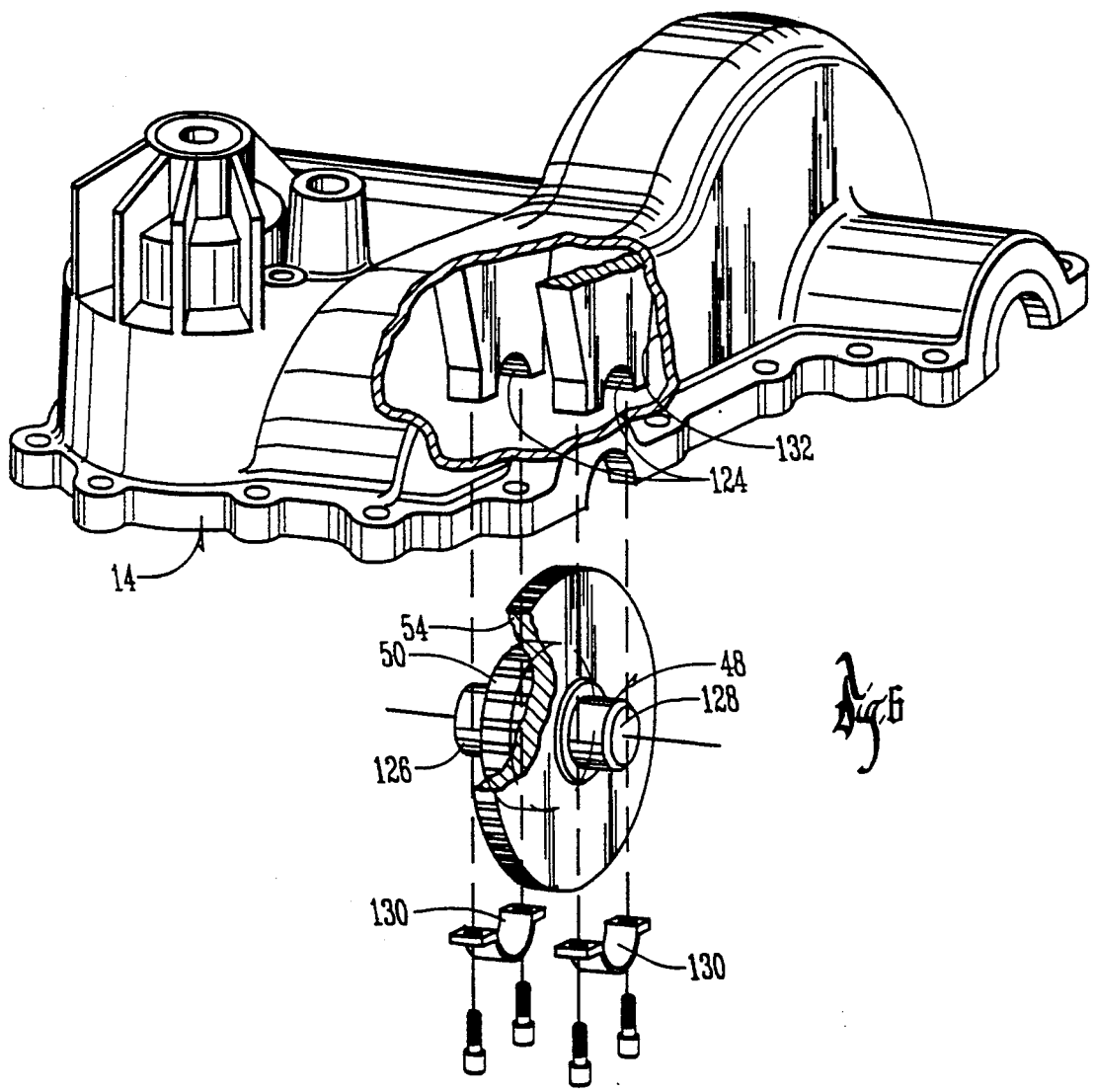

COMPACT INTEGRATED TRANSAXLE

FIELD OF THE INVENTION

This invention relates to a transaxle and, more particularly, to a compact integrated hydrostatic transaxle which mounts a hydrostatic transmission integrally within a casing in a manner which reduces the packaging requirements of the transaxle.

BACKGROUND OF THE INVENTION

Hydraulically driven equipment, such as lawn tractors, have had transaxle structure mounted in a casing including a drive input connection, a gear reduction drive, and oppositely-extending differentially-connected axle shafts. Typically, a hydrostatic transmission is connected to the exterior of the casing with a power output from the hydrostatic transmission driving the axle shafts to transmit power from the drive input to the transaxle.

Because of stringent packaging restrictions necessitated by the operating environments which are defined in the hydraulic equipment in which transaxles and hydrostatic transmissions are utilized, it is desirable to minimize the size of the assembled components without sacrificing performance capability of the transaxle.

One approach to providing a more compact transaxle has been to integrate the hydrostatic transmission with the transaxle components in a common casing. For example, as shown in prior U.S. Pat. No. 4,903,545 to Louis et al, dated Feb. 27, 1990, a transmission center section has been proposed for mounting the two hydraulic displacement units of a conventional hydrostatic transmission in perpendicular relation within a transaxle casing. While this construction has proven successful, the design has some limitations in very compact envelope or packaging applications.

As disclosed in the U.S. Pat. No. 4,903,545, an integrated transaxle utilizing the center section has a two-piece casing with the axle shafts, a hydraulic motor output shaft, and a counter-rotating intermediate shaft for transferring motion between the output shaft and the axle shafts, all of which are sandwiched between upper and lower casing parts. In order to align each of the shafts along the casing split line, it is necessary to arrange each of the components in a side-by-side, substantially parallel coplanar relationship. This type of arrangement requires an enlarged transaxle casing to envelope all of the juxtaposed shafts and associated components.

In addition, in the U.S. Pat. No. 4,903,545, in order to accommodate fluid passages for achieving communication between a hydraulic pump and the motor, the pump mounting surface is formed coplanar with the horizontal split line between the casing parts. The hydraulic pump is fixed to the pump mounting surface above the split line and has a vertically extending shaft which projects upwardly through the transaxle casing. Because the entire pump is positioned above the casing split line, the upper casing part must necessarily be sufficiently voluminous to house the pump, resulting in a large integrated transaxle package.

This invention is directed to further improvements in hydrostatic transaxles and which are specifically directed to reducing the packaging or envelope of the transaxle.

SUMMARY OF THE INVENTION

An object, therefore, of the invention, is to provide a new and improved integrated hydrostatic transaxle in which a hydrostatic transmission is mounted integrally within a transaxle casing in a manner which reduces the size of the integrated transaxle assembly.

In the exemplary embodiment of the invention, an integrated hydrostatic transaxle includes a two-piece transaxle casing for rotatably mounting a pair of oppositely extending drive axles along a peripheral seam formed between an upper casing part and a lower casing part. A hydrostatic transmission also is mounted in the transaxle casing and has a center section positionable in the transaxle casing with a pair of faces each mounting a hydraulic displacement unit. A counter-rotating intermediate shaft is interposed between one of the hydraulic units and the drive axles and is journalled within the transaxle casing offset from a plane defined by the peripheral seam.

Preferably, one of the pair of hydraulic units is a hydraulic motor having an associated motor shaft which extends along the peripheral seam, with the axles and the motor shaft extending in a generally coplanar relationship.

The intermediate shaft is journalled for rotation in a bearing formed between the upper and lower casings. An upper bearing surface is formed integrally with the upper casing inwardly of the peripheral seam and a complementary lower bearing surface is formed integrally with the lower casing and projects upwardly above the peripheral seam and into the upper casing. The upper and lower bearing surfaces cooperate to journal opposite ends of the intermediate shaft for rotation within the upper half casing.

Alternatively, the inboard end of the intermediate shaft is captured between bearing surfaces which are formed integrally with the upper and lower casing, and the outboard end of the intermediate shaft is journalled in separate bearing mount which is bolted to an inner wall of the upper casing.

In an additional alternative embodiment, the intermediate shaft interconnects rotatable gears mounted on the motor shaft and the transaxle. The gears mesh with mating pinion gear elements fixed to the intermediate shaft and generate a force adapted to rotatably support the intermediate shaft within a cavity formed in the interior sidewall of the upper casing.

The center section is positionable in the transaxle casing and mounts a hydraulic pump on one face and mounts the hydraulic motor on another face. The pump mounting face and the intermediate shaft are oppositely offset from the plane defined by the peripheral seam, with the intermediate shaft being disposed within the upper casing and extending above the peripheral seam, and the pump mounting face being disposed within the lower casing and extending below the peripheral seam between the upper and lower casing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood with reference to the following description taken in conjunction with the accompanying drawings, in which like reference numerals identify like elements in the figures and in which:

FIG. 3 is a vertical section taken generally along line 3—3 in FIG. 2;

FIG. 4 is an exploded perspective view illustrating a bearing support structure within the transaxle casing;

FIG. 6 is an exploded perspective of a further alternative embodiment of a bearing support structure in an upper casing part.

DETAILED DESCRIPTION OF THE INVENTION

Figure 1:
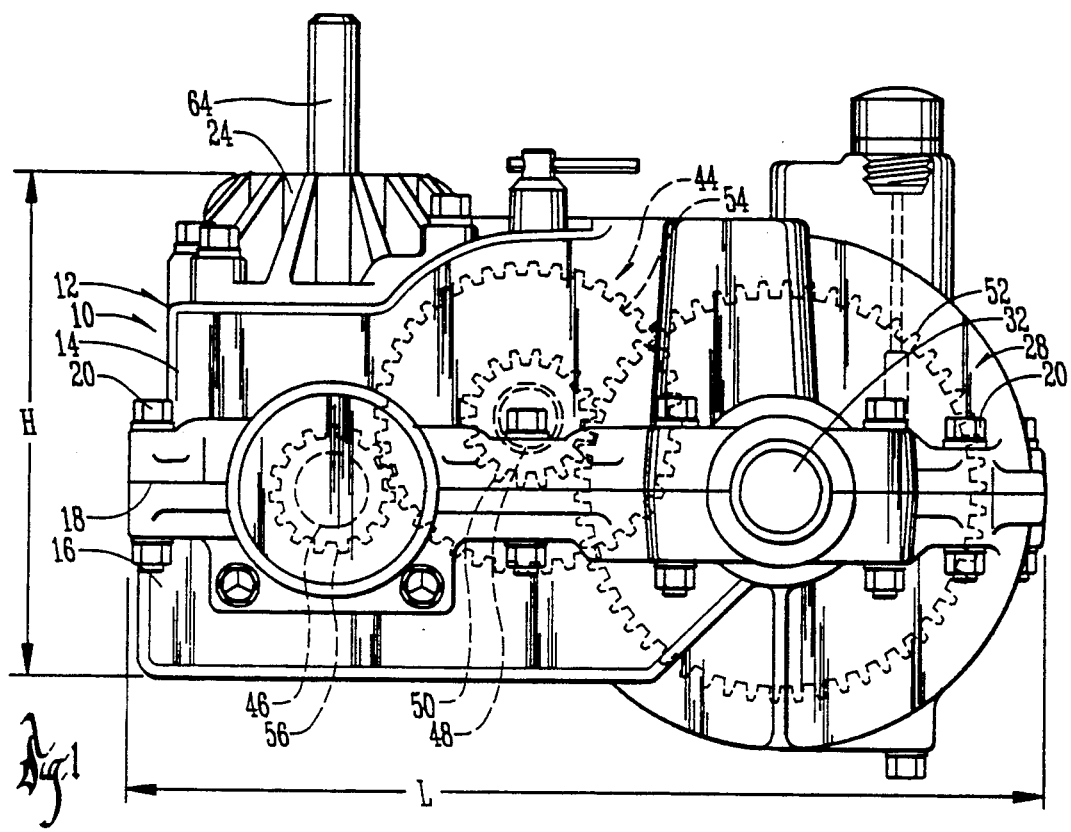
FIG. 1 is a side elevational view of an integrated hydrostatic transaxle.

An integrated hydrostatic transaxle is illustrated in FIG. 1 and generally designated 10. The integrated hydrostatic transaxle has a common housing or casing 12 which includes an upper casing part 14 and a lower casing part 16 joined together along a generally planar peripheral seam 18. The peripheral seam is oriented generally horizontal when the integrated hydrostatic transaxle is installed in an operative position. Casing parts 14 and 16 are held in assembled relation by a series of bolts 20 extending through peripheral flanges in the upper and lower casing parts which meet at peripheral seam 18.

Figure 2:
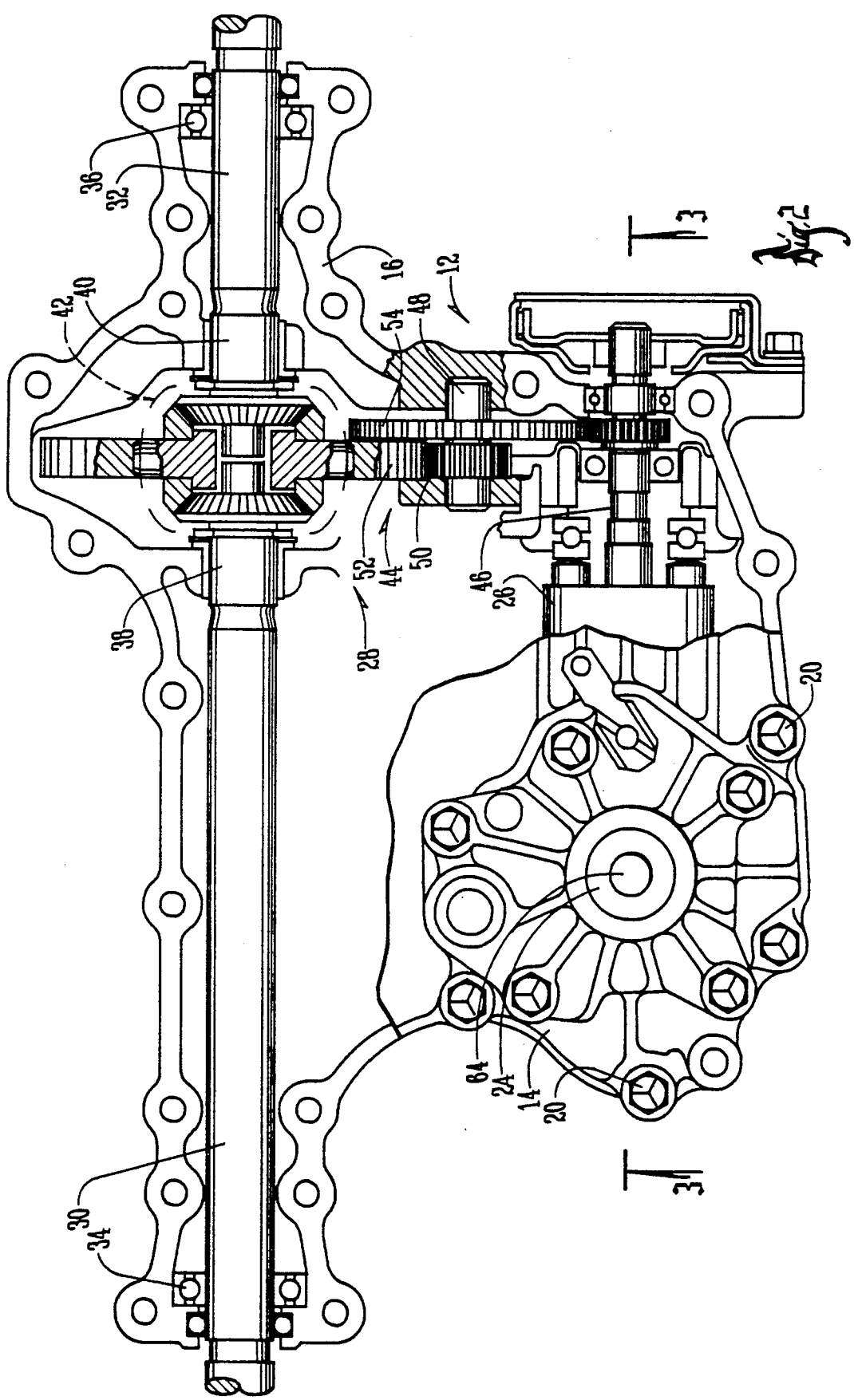
FIG. 2 is a top plan view of the integrated hydrostatic transaxle, with parts broken away.

The shape of the casing parts is shown in plan in FIG. 2 with a portion of upper casing part 14 shown in the lower left part of the FIGURE and with the remainder of the top casing part broken away to show lower casing part 16 and various components inside the casing.

Common casing 12 encloses a hydrostatic transmission including a pair of hydraulic displacement units 24 and 26, respectively, and transaxle components generally designated 28. Transaxle components 28 are described in earlier U.S. Pat. No. 4,903,545 issued Feb. 27, 1990 and include a pair of oppositely extending axle shafts 30 and 32 lying within the horizontal plane defined by peripheral seam 18 and having ends extended beyond the lower casing part for mounting drive wheels (not shown). Axle shafts 30 and 32 have bearings 34 and 36 at their outboard ends and thrust bearings 38 and 40 at their inboard ends for rotatable support in common casing 12.

Axle shafts 30 and 32 are geared together through a differential, designated generally 42. A gear reduction drive 44 interconnects an output shaft 46 on hydraulic displacement unit 26 with differential 42. Gear reduction drive 44 has a rotary intermediate shaft 48 interposed in a substantially parallel relationship between axle shafts 30 and 32 and output shaft 46. An inboard pinion gear 50 is fixed to intermediate shaft 48 and is interconnected to differential 42 through a transfer gear 52. An outboard drive gear 54 is fixed to intermediate shaft 48 and is drivingly connected with a gear 56 on output shaft 46. Intermediate shaft 48 thereby is coupled with output shaft 46 and differential 42 for transmitting rotary motion between hydraulic displacement unit 26 and axle shafts 30 and 32. Intermediate shaft 48 is journalled for rotation within casing 12 in a manner which will be described in detail below.

Each hydraulic displacement unit 24 and 26 is shown in detail in FIG. 3 and generally is of the same construction. Hydraulic displacement unit 24 has a rotatable cylinder block 60 connected by a splined connection 62 to a drive input shaft 64 having an internal end rotatable in a journal 65 positioned in a one-piece transmission center section, generally designated 68. The outboard end of drive input shaft 64 is rotatably supported in upper casing part 14 by means of a bearing 66. A lip seal 72 seals the shaft opening in upper casing part 14.

Rotatable cylinder block 60 has a series of piston-receiving chambers 74, each of which movably mount a piston 76 of a relatively large diameter. Each piston 76 is urged by an associated spring 78 into following engagement with a swashplate structure. Hydraulic displacement unit 24 has overcenter variable displacement achieved by angular adjustment of a swashplate 80 which, as is known in the art, can have its angle varied from the clockwise position shown in FIG. 3 to an opposite extreme position and by manually operable structure, not shown. The swashplate can pivot about a pivot axis in a counterclockwise direction and past a horizontal center position, as viewed in FIG. 3. Swashplate 80, as is known in the art, mounts a thrust plate 82 against which the pistons abut. A ball thrust bearing 86 is interposed between the thrust plate and the swashplate to rotatably mount the thrust plate.

Hydraulic displacement unit 26 is a fixed displacement unit and has a rotatable cylinder block 88 with a plurality of piston-receiving chambers each movably mounting a piston 90 which is spring-urged by a spring 92 toward a swashplate 94. Swashplate 94 has a thrust plate 96 against which an end of the pistons engages. A ball thrust bearing 98 is interposed between the thrust plate and the swashplate to rotatably mount the thrust plate. Rotatable cylinder block 88 drives output shaft 46 through a splined connection 100 therebetween. An inner end of output shaft 46 rotates within an opening 102 in the center section 68 which has a journal 104. The outboard end of output shaft 46 is sealed by a lip seal 106 and with a bearing structure disposed interiorly thereof including a ball bearing 108. As seen in FIG. 1, the centerline of output shaft 46 is located along peripheral seam 18 formed between upper casing part 14 and lower casing part 16 in substantially parallel or coplanar relationship with axle shafts 30 and 32.

Hydraulic displacement units 24 and 26 have their respective rotatable cylinder blocks arranged with their axes of rotation generally at right angles to each other. One-piece center section 68 is generally L-shaped to have a pair of faces generally at right angles to each other with one planar face 110 having arcuate ports (not shown) coacting with an adjacent face of the rotatable cylinder block 60 of the variable displacement unit 22, which operating as a pump, and a second planar face 112 having arcuate ports (not shown) coacting with an adjacent face of the rotatable cylinder block 88 of the hydraulic displacement unit 22, which preferably operates as a motor. Operation of a conventional center section is detailed in the aforesaid Louis and Johnson U.S. Pat. No. 4,903,545 which is incorporated herein by reference.

The foregoing description generally describes an integrated transaxle wherein a hydrostatic transmission having a pair of hydraulic displacement units and associated transaxle components are mounted within a two-piece common casing as illustrated in FIGS. 1-3.

As stated previously, it is desirable to minimize the packaging requirements of an integrated transaxle without sacrificing performance capability. Accordingly, center section 68 is uniquely designed to enable the placement of hydraulic displacement unit 24 in such a way that the height requirements of the integrated transaxle are reduced. Specifically, pump mounting planar face 110 extends below peripheral seam 18, that is, downwardly offset from the plane defined by the peripheral seam, to allow hydraulic displacement unit 24 to be recessed into lower casing part 16. With hydraulic displacement unit 24 mounted to the recessed mounting face 110, a smaller internal volume of upper casing part 14 is required, and the transaxle easily can be housed within a casing 12 having a reduced height "H", which is less than the height of existing typical transaxles in which the pump mounting face is substantially coplanar with the plane defined by the peripheral seam between the upper and lower casing parts.

The support referred to above for intermediate shaft 48 is achieved by a support structure associated with common casing 12. In order to comply with the aforesaid objective of reducing packaging size requirements, intermediate shaft 48 is vertically offset from peripheral seam 18, that is, spaced above the plane defined by the split between upper casing part 14 and lower casing part 16 by a cradle support, generally designated 114 in FIG. 4. The cradle support includes a pair of upstanding legs 116 formed integrally in lower casing part 16 and having recessed ends 118. Complementary pockets 120 are formed integrally with upper casing part 14, such that recessed ends 118 of upstanding legs 116 are aligned with pockets 120 when the upper casing part and the lower casing part are mated along peripheral seam 18. Bearing elements 122 are captured between legs 116 and upper casing part 14 to rotatably support opposite ends of intermediate shaft 48 inwardly of the periphery of casing 12. As shown in FIG. 1, the vertical offset of intermediate shaft 48 from peripheral seam 18 and output shaft 46 and axle shafts 30 and 32 permits a compact arrangement of the shafts which can be easily housed within a casing having a reduced length "L" which is less than the length of existing typical transaxles in which the motor shaft, drive axles, and intermediate shaft extend in a substantially coplanar relationship with the plane defined by the peripheral seam between the upper and lower casing parts.

Figure 5:
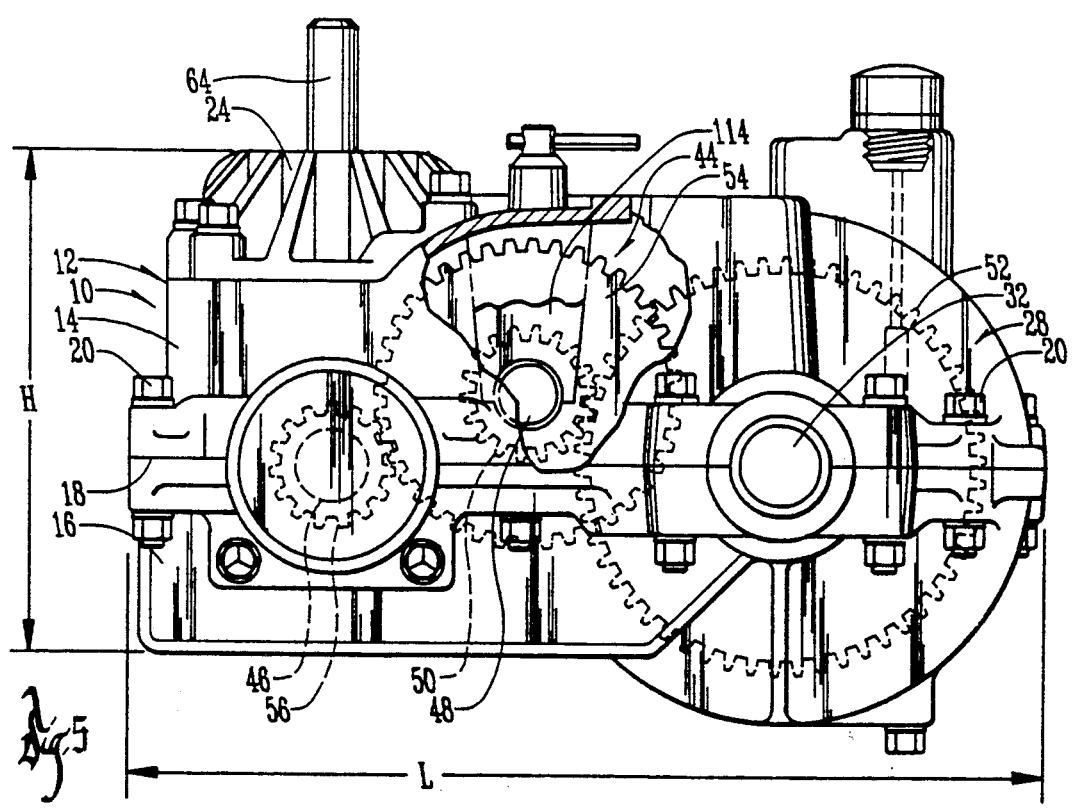
FIG. 5 is a diagrammatic illustration of an alternative form of the bearing support structure illustrated in FIG. 4.

As an alternative to the support structure shown in FIG. 4, the present invention envisions that intermediate shaft 48 can be rotatably secured in the pockets 120 formed in upper casing part 14 by means of gear forces which are generated as a result of a driving connection formed between differential and output shaft 46. Specifically, as shown in FIG. 5, gear 56 is fixed to motor shaft 46 in driving interconnection with outboard drive gear 54 on intermediate shaft 48. Transfer gear 52 is concentric with axle shafts 30 and 32 and mounted in driving interconnection with differential 42 and inboard drive pinion 50 on intermediate shaft 48. Forces acting between the rotating gears develop a vertical force component which acts upwardly against drive pinion 50 and gear 54 to continuously locate the intermediate shaft within upper casing part 14 and secured against pockets 120.

In still another alternative embodiment of the invention shown in FIG. 6, intermediate shaft 48 is journalled for rotation within bearing structure associated solely with upper casing part 14. A laterally opening recess 124 is formed integrally in the upper casing part and rotatably receives an inboard end 126 of the intermediate shaft. An outboard end 128 of intermediate shaft 48 is supported on a separate bearing mount 130 bolted to an interior wall 132 of upper casing part 14 in alignment with recess 124. Specialized bearing structure is not required in lower casing part 16 and intermediate shaft 48 can be easily removed for servicing the transaxle components 28 by unbolting bearing mount 130. Similar to the arrangement envisioned in each of the previously described embodiments, intermediate shaft 48 is vertically offset from output shaft 46 and axle shafts 30 and 32 and is contained completely within upper casing part 14.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An integrated hydrostatic transaxle comprising:
   a transaxle casing rotatably mounting a pair of oppositely extending axles along a substantially horizontal peripheral seam formed between a first casing part and a second casing part;
   a hydraulic pump;
   a hydraulic motor having an associated output shaft;
   a center section positionable in the casing and having first and second faces, the first face being a pump mounting face for mounting the hydraulic pump within the transaxle casing and the second face being a motor mounting face for mounting the hydraulic motor within the transaxle casing with the output shaft extending along the peripheral seam; and
   an intermediate shaft interposed between the output shaft and the axles, the intermediate shaft being journalled in the transaxle casing offset from a plane defined by the peripheral seam and substantially parallel to the pump mounting face, the pump mounting face being offset from a plane defined by the peripheral seam.

2. The integrated hydrostatic transaxle of claim 1 in which the intermediate shaft and the pump mounting face are oppositely offset from the plane defined by the peripheral seam, the intermediate shaft being disposed within the first casing part and extending above the peripheral seam and the pump mounting face being disposed within the second casing part and extending below the peripheral seam.

3. An integrated hydrostatic transaxle comprising:
   a transaxle casing including a first casing part and a second casing part joined along a substantially planar and horizontal peripheral seam formed therebetween, the transaxle casing rotatably mounting a pair of oppositely extending axles;
   a hydraulic pump;
   a hydraulic motor having an associated output shaft and being mounted within the transaxle casing; and
   a pump mounting surface in the transaxle casing and offset from the plane defined by the peripheral seam for mounting the hydraulic pump within one of the first or the second casing parts.

4. The integrated hydrostatic transaxle of claim 3 including an intermediate shaft interposed between the output shaft and the axles, the intermediate shaft being journalled in the transaxle casing offset from the plane defined by the peripheral seam.

5. The integrated hydrostatic transaxle of claim 4 in which the pump mounting face and the intermediate shaft extend in substantially parallel relationship.

6. An integrated hydrostatic transaxle having a two-piece transaxle casing for mounting a hydrostatic transmission and a pair of oppositely-extending differentially-connected axles between a first casing part and a second casing part, the hydrostatic transmission comprising:
- a hydraulic pump;
- a hydraulic motor having an associated output shaft, the output shaft and the axles extending along a substantially horizontal peripheral seam formed between the first casing part and the second casing part;
- a one-piece center section positionable in the casing and having first and second faces generally at right angles to each other, the first face being a pump mounting face for mounting the hydraulic pump and the second face being a motor mounting face for mounting the hydraulic motor, the pump mounting face being offset from the plane defined by the peripheral seam; and
- an intermediate shaft interposed between the output shaft and the axles, the intermediate shaft being offset from the plane defined by the peripheral seam.

7. The integrated hydrostatic transaxle of claim 6 in which the intermediate shaft is journalled for rotation in a bearing in the transaxle casing, the intermediate shaft and the pump mounting face being oppositely offset from the peripheral seam, with the intermediate shaft disposed in the first casing part and extending above the peripheral seam and the pump mounting face disposed in the second casing part and extending below the peripheral seam.

8. The integrated hydrostatic transaxle of claim 7 in which the bearing comprises a first bearing surface integral with the first casing part and formed inwardly of the peripheral seam, and a complementary second bearing surface integral with the second casing part and formed inwardly of the peripheral seam, the first bearing surface and the second bearing surface cooperating to capture an end of the intermediate shaft for journalled rotation therebetween.

9. The integrated hydrostatic transaxle of claim 7 in which the intermediate shaft interconnects a first gear on the output shaft and a second gear on the axles, the first gear and the second gear rotatably supporting the intermediate shaft within the first casing part.

10. The integrated hydrostatic transaxle of claim 9 in which a cavity is formed in an interior sidewall of the first casing part, the first gear and the second gear rotatably supporting an end of the intermediate shaft within the cavity.

* * * * *

UNITED STATES PATENT AND TRADEMARK OFFICE
CERTIFICATE OF CORRECTION

PATENT NO. : 5,156,576
DATED : August 30, 1994
INVENTOR(S) : Alan W. Johnson

It is certified that error appears in the above-identified patent and that said Letters Patent is hereby corrected as shown below:

<u>Title page,</u>
Item [73], should be shown as follows:
-- [73]   Assignee:  Sauer Inc., Ames, Iowa --

Signed and Sealed this

Fifteenth Day of July, 2003

JAMES E. ROGAN
*Director of the United States Patent and Trademark Office*

REEXAMINATION CERTIFICATE (2374th)
United States Patent [19]
Johnson

[11] B1 5,156,576
[45] Certificate Issued Aug. 30, 1994

[54] COMPACT INTEGRATED TRANSAXLE

[75] Inventor: Alan W. Johnson, Ames, Iowa

[73] Assignee: Sauer, Inc., Ames, Iowa

Reexamination Request:
No. 90/003,181, Aug. 23, 1993

Reexamination Certificate for:
Patent No.: 5,156,576
Issued: May 22, 1991
Appl. No.: 703,930
Filed: Oct. 20, 1992

[51] Int. Cl.$^5$ .................................... F16H 57/02
[52] U.S. Cl. ................................... 475/72; 475/206; 74/606 R; 60/487
[58] Field of Search .............. 475/72, 83, 84, 206; 74/606 R; 60/487

[56] References Cited

U.S. PATENT DOCUMENTS

| | | | |
|---|---|---|---|
| 2,480,069 | 8/1949 | Wright | 91/499 |
| 4,616,478 | 10/1986 | Jensen | 60/489 |
| 4,891,943 | 1/1990 | Okada | 60/464 |
| 4,899,541 | 2/1990 | Okada et al. | 60/487 |
| 4,903,545 | 2/1990 | Louis et al. | 74/606 R |
| 4,905,472 | 3/1990 | Okada | 60/487 |
| 4,914,907 | 4/1990 | Okada | 60/487 |
| 4,932,209 | 6/1920 | Okada et al. | 60/487 |
| 4,953,426 | 9/1990 | Johnson | 74/606 R |
| 4,979,583 | 12/1990 | Thoma et al. | 180/62 |
| 5,031,403 | 7/1991 | Okada | 60/487 |
| 5,156,576 | 10/1992 | Johnson | 475/72 |

FOREIGN PATENT DOCUMENTS 64-4520  1/1989  Japan.

*Primary Examiner*—Dirk Wright

[57] ABSTRACT

A compact integrated transaxle has a two-piece transaxle casing for rotatably mounting a pair of oppositely extending axles along a peripheral seam formed between an upper casing part and a lower casing part. A hydrostatic transmission is also mounted in the transaxle casing and has a center section positionable in the transaxle casing with a pair of perpendicular faces each mounting a hydraulic displacement unit. One of the center section faces defines a hydraulic pump mounting surface and is offset from the plane defined by the peripheral seam. A counter-rotating intermediate shaft is interposed between an output shaft on one of the hydraulic units and the axles and is journalled within the transaxle casing offset from the plane defined by the peripheral seam.

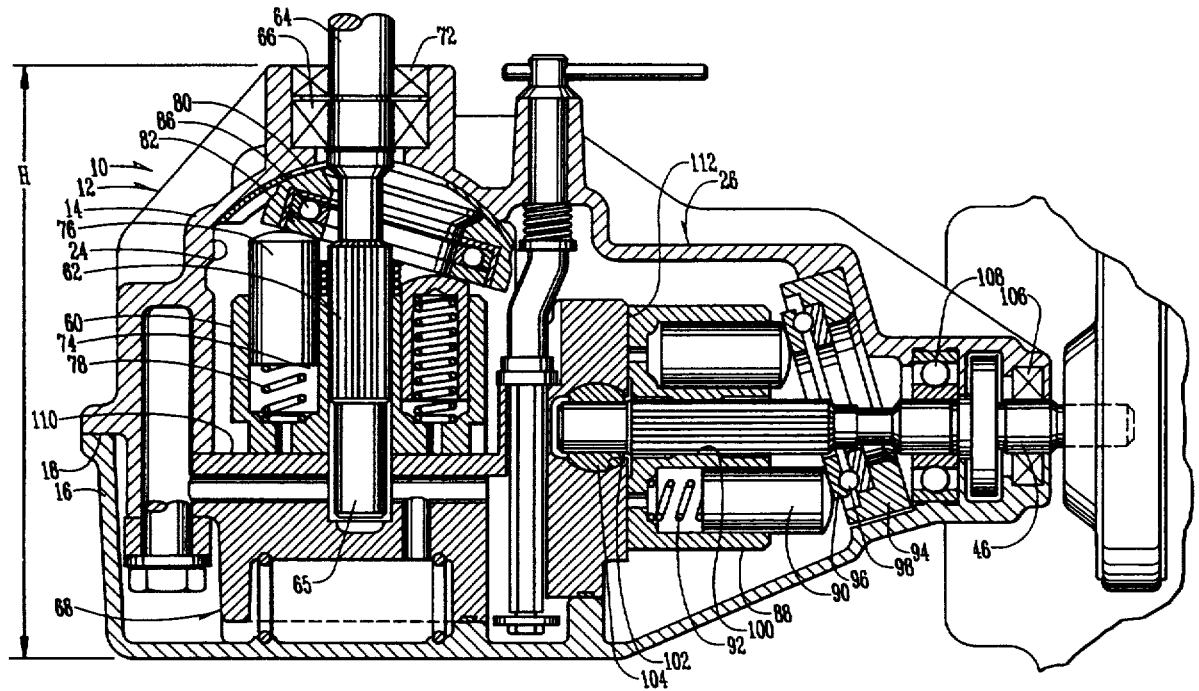

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2 & 4 & 6–10 is confirmed.

Claim 3 is cancelled.

Claim 5 is determined to be patentable as amended.

5. The integrated hydrostatic transaxle of claim 4 in which the pump mounting [face] *surface* and the intermediate shaft extend in substantially parallel relationship.

* * * * *